(12) United States Patent
Haas

(10) Patent No.: US 8,385,472 B2
(45) Date of Patent: Feb. 26, 2013

(54) CONTEXT-SENSITIVE OVERHEAD PROCESSOR

(75) Inventor: Wally Haas, Mount Pearl (CA)

(73) Assignee: Altera Canada Co., Halifax, NS (CA)

( * ) Notice: Subject to any disclaimer, the term of this patent is extended or adjusted under 35 U.S.C. 154(b) by 0 days.

(21) Appl. No.: 13/084,439

(22) Filed: Apr. 11, 2011

(65) Prior Publication Data

US 2011/0182581 A1    Jul. 28, 2011

Related U.S. Application Data

(63) Continuation of application No. 11/902,532, filed on Sep. 24, 2007, now Pat. No. 7,924,938.

(51) Int. Cl.
*H03K 9/00* (2006.01)
*H04L 27/00* (2006.01)
*H04L 7/00* (2006.01)

(52) U.S. Cl. ............ 375/316; 375/295; 375/354

(58) Field of Classification Search ........... 375/316, 375/295, 354; 398/58
See application file for complete search history.

(56) References Cited

U.S. PATENT DOCUMENTS

| | | |
|---|---|---|
| 4,873,456 A | 10/1989 | Olisar et al. |
| 4,879,481 A | 11/1989 | Pathak et al. |
| 4,974,223 A | 11/1990 | Ancheta et al. |
| 5,023,484 A | 6/1991 | Pathak et al. |
| 5,185,799 A | 2/1993 | McNesby et al. |
| 5,471,476 A | 11/1995 | Hiramoto |
| 5,717,693 A | 2/1998 | Baydar et al. |
| 5,809,032 A | 9/1998 | Weeber et al. |
| 6,359,859 B1 | 3/2002 | Brolin et al. |
| 6,449,292 B1 | 9/2002 | Weeber |
| 6,614,796 B1 * | 9/2003 | Black et al. ............ 370/403 |
| 7,613,991 B1 | 11/2009 | Bain |
| 2002/0080830 A1 | 6/2002 | Carson et al. |
| 2002/0172225 A1 | 11/2002 | Ang et al. |
| 2007/0214230 A1 * | 9/2007 | Sano et al. ............ 709/212 |
| 2007/0237143 A1 * | 10/2007 | Rodgers et al. ............ 370/392 |

OTHER PUBLICATIONS

Goralski, Walter, SONET/SDH, 3rd ed., McGraw-Hill, Toronto, Canada, 2002, pp. 193-227.

* cited by examiner

*Primary Examiner* — David C. Payne
*Assistant Examiner* — Brian J Stevens
(74) *Attorney, Agent, or Firm* — Ropes & Gray LLP

(57) ABSTRACT

An overhead processor for data transmission in digital communications, where a state machine, including a logic element and a flip-flop, is able to process a "previous" data state and a "next" data state simultaneously by storing the previous state in an external elastic storage element until the next state arrives along the datapath. By employing flip-flops on the path from the logic element to the elastic store and on the path from the elastic store to the logic element, data is transmitted faster, resulting in the ability for both the previous data state and the next data state to be transmitted simultaneously, in one clock cycle, requiring half of the transmission time required by prior art.

20 Claims, 6 Drawing Sheets

SONET STS-N Frame

Basic Synchronous State Machine (Prior Art)

Second Illustrative Embodiment of the
Context-Sensitive Overhead Processor

Further Illustrative Embodiment of the
Context-Sensitive Overhead Processor

The (Storage) Elastic Store

The Present Invention

CONTEXT-SENSITIVE OVERHEAD PROCESSOR

CROSS-REFERENCE TO RELATED APPLICATIONS

This application is a continuation of U.S. patent application Ser. No. 11/902,532, filed Sep. 24, 2007, which is hereby incorporated by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Technical Field of the Invention

The present invention relates to the overhead (OH) bytes of synchronous optical networks such as Synchronized Optical Networking (SONET) and Synchronous Digital Hierarchy (SDH) telecommunication standards.

2. Background of the Invention

Synchronous Optical Networking (SONET) and Synchronous Digital Hierarchy (SDH) are closely related standards for transporting digital information over optical fiber using lasers or Light Emitting Diodes (LEDs). In synchronous optical networking, the payload and overhead of the frame are transmitted through interleaving, with a portion of the overhead being transmitted, then a portion of the payload, then another portion of the overhead, etc., until the entire frame has been transmitted. In both SONET and SDH the entire frame is transmitted in 125 microseconds; the SONET frame totals 810 octets in size, 27 octets of overhead with 783 octets of payload, while the SDH frame totals 2430 octets in size, 81 octets of overhead with 2349 octets of payload.

The fundamental components of a synchronous optical networking frame include the Synchronous Payload Envelope (SPE) and the Transport Overhead (TOH), which includes the Section Overhead (SOH) and Line Overhead (LOH). The present invention relates to such OH, which includes bytes H1, H2, H3, B1, B2, J0, J1, etc. Below, the "Second Illustrative Embodiment of the Present Invention" demonstrates the "Context-Sensitive Overhead Processor" (CSOP) operating on the H1/H2 pointer pair for explanative purposes; therefore, a general background of the H1/H2 pointer pair is provided.

The pointer mechanism channels are found in bytes H1/H2/H3, which are located in the fourth row and first three columns of a SONET/SDH frame (see FIG. 1). In SONET, the H1/H2 bytes are responsible for identifying the beginning of the SPE (J1) at all times, while in SDH, the H1/H2/H3 bytes comprise the Administrative Unit (AU), which may point to three distinct Tributary Units (TUs). The H1/H2 bytes must always identify the first byte of the Path Overhead (POH), which is the first byte of the SPE: in SONET the first byte is referred to as the Virtual Tributary (VT), identified by the TU-3 pointer; in SDH the first byte is referred to as the Virtual Container (VC), identified by the AU-3 or AU-4 pointers. Due to jitter and/or other timing factors, the start of the SPE may move within the payload envelope; therefore, the pointer bytes provide a mechanism for the sender to inform the receiver where the individual data containers of the SPE are located at all times. The New Data Flag (NDF), contained within the H1/H2 bytes, permits the pointer position to change in response to a move in the position of the payload, and the H3, or pointer action byte, compensates for timing changes in the payload by providing negative or positive timing adjustments through holding stuff bytes, when necessary. The H1/H2 bytes indicate when the H3 byte carries value. The interaction of the H1/H2/H3 bytes therefore provides the ability for high speed transmission of frames over the synchronous network without the addition of large buffers.

In SONET/SDH synchronous optical networking, the H1/H2 bytes adhere to strict pointer rules; the structure of the H1 byte is always NNNNSSID and the structure of the H2 byte is always IDIDIDID. The "N" bits in the H1 bytes constitute the NDF, which for normal pointer operation, are set to a value of 0110. A NDF value of 1001 indicates the previous pointer was incorrect, and the receiver is to use the new pointer indicated in the IDIDIDID field(s). If the received bit configurations are not "1001" or "0110" the "three of four rule" is used; 1110 is interpreted as 0110, 1101 is interpreted as 1001, etc. The next 2 bits in the H1 byte (SS) have no value in SONET, but are reserved as place keepers with a "00" value. These bits formerly carried sizing and mapping information, which are now located elsewhere SDH still assigns value to the S bits, normally "10" for both AU-3 and AU-4.

The last 2 bits of the H1 byte, combined with the 8 bits in the H2 byte, form the pointer to the SPE located in J1. These IDIDIDID bits are used to indicate the type of adjustment(s) that may be required if the SPE has moved. If a positive pointer adjustment is about to occur, the "I" bits invert the pointer value that has been received for a period of 1 frame, with the second frame containing the new value and the pointer adjustment. If a negative pointer adjustment is about to occur, the "D" bits invert the pointer value that has been received for a period of 1 frame, with the second frame containing the new value and the pointer adjustment. In order for the new pointer to be counted as valid, the new pointer must be maintained for at least 3 frames.

While processing of the H1/H2 pointer pair is explored in the "Second Illustrative Embodiment of the Present Invention," as a means of further demonstrating the present invention, it is important to note that this embodiment of the invention is not intended to be restrictive, for the present invention is constructed to operate on all OH bytes, including B1, B2, J0, J1, etc., and can therefore be performed in multiple embodiments.

SUMMARY OF THE INVENTION

The present invention increases and therefore improves the rate of data transmission found in the prior art through reducing the number of OH processors required in synchronous optical network transmission to the number of bytes in a datapath. Unlike some prior overhead processors, the present invention does not require the use of a substitution element. In addition, the present invention differs from prior art by employing multiple flip-flops, located on the path from the logic element to the elastic store (4), and on the path from the elastic store to the logic element (5); such flip-flops break up the pathways between the elastic store and the logic element, allowing the data to be transmitted faster, and resulting in the ability for both the previous OH context and next OH context to be transmitted simultaneously, in one clock cycle, requiring half of the time necessary in the prior art. In addition, the latency from an elastic store, such as a RAM, is higher than the latency from a flip flop; thus by employing flip-flops along the pathway between the logic element to the elastic store, as well as the pathway between the elastic store and the logic element, the present invention is able to reduce the latency of the system.

The object of the present invention, the "Context-Sensitive Overhead Processor" (CSOP), is to allow an elastic store to load in the context of previous Overhead (OH) byte operations to reduce the number of OH processors required. As noted above, each OH byte contains important information for each STS/STM. These bytes are present on the data bus once every 810 bytes*N or 2430*M, where N is the STS number for SONET and M is the STM number for SDH, respectively. For the purposes of this summary, the present invention will be described employing SONET, the North American synchronous networking standard; however, the present invention is also applicable to SDH.

A SONET STS-N SPE frame consists of N bytes interleaved. The SONET frame is structured with 90 columns and 9 rows, for a total of 810 bytes. The present embodiment of the invention employs a 256 bit datapath. Each STS window is interleaved in a stack behind the initial STS window, and data is transmitted, window-by-window, from the first byte of the first frame, to the first byte of the second frame, etc. First, incoming data is transmitted along a datapath. If said incoming data forms one group of data (see FIG. 3), the group of data is transmitted along the datapath, is optionally stored in an elastic store, and then is transmitted into one or more flip-flop(s); if there are two or more groups of incoming data, arriving separately, the initial group of received data can optionally be stored in an elastic store until the arrival of additional group(s) of data, and upon the arrival of said additional group(s) of data, all of the received data are combined and transmitted into said flip-flop(s). The data is then transmitted from said flip-flop(s) to a logic element, the CSOP, comprised of a logic element and a flip-flop, which uses the received data context to determine the new data context of the next incoming OH bytes. The CSOP transmits the new data context to an elastic store. Said elastic store presents the new data context back through the initial flip-flop(s) and into the logic element, the CSOP, prior to any additional incoming bytes arriving along the datapath.

DETAILED DESCRIPTION OF AN ILLUSTRATIVE EMBODIMENT OF THE INVENTION

The following disclosure of the "illustrative embodiment of the invention" sets forth a detailed description to provide a more complete understanding of the present invention; however, the present invention is not limited by the details set forth as the "illustrative embodiment of the invention" and the invention may be fully utilized in other embodiments. The "illustrative embodiment of the invention," disclosed herein, is intended for explanative purposes and is by no means conclusive. In addition, the "illustrative embodiment of the invention" will be described employing SONET, the North American synchronous networking standard, while the present invention is equally pertinent to SDH and other methods of digital communications.

Figure 1:
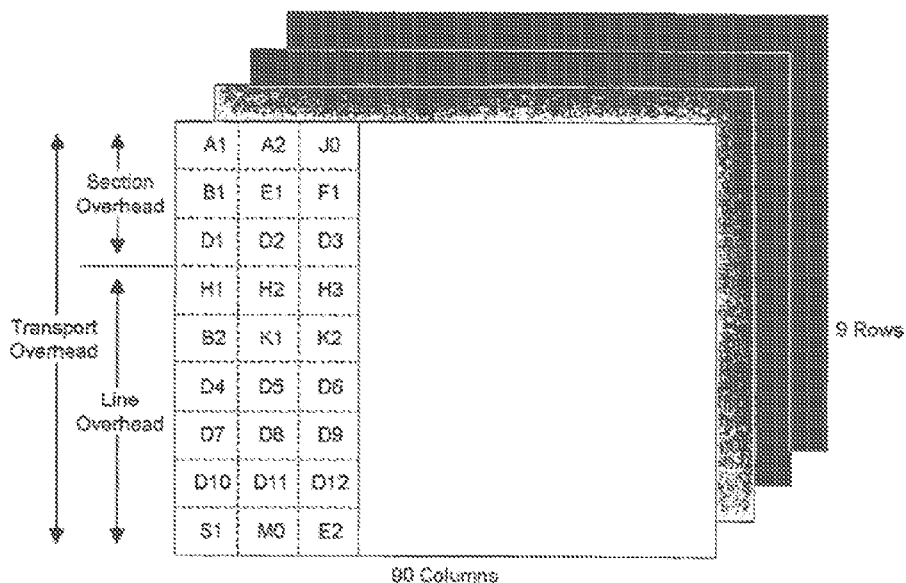
FIG. 1 depicts a basic SONET STS frame window.

FIG. 1 depicts a basic SONET STS frame window, indicating the position of the various OH Bytes, with other STS windows interleaved behind. The present embodiment of the invention employs a SONET STS-N frame, consisting of an arbitrary 768 windows, each containing 1 byte. The STS frame windows are interleaved from STS-1, STS-2, STS-3, etc., through to STS-N (which, in the present embodiment, ceases at STS-768). Therefore, employing this STS-768 frame, the receiver can expect each OH byte to be transmitted 768 times.

Figure 2:
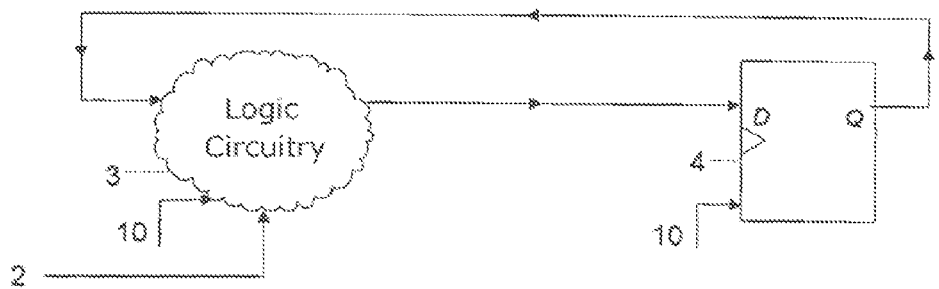
FIG. 2 depicts a basic synchronous state machine, as in prior art.
Figure 3:
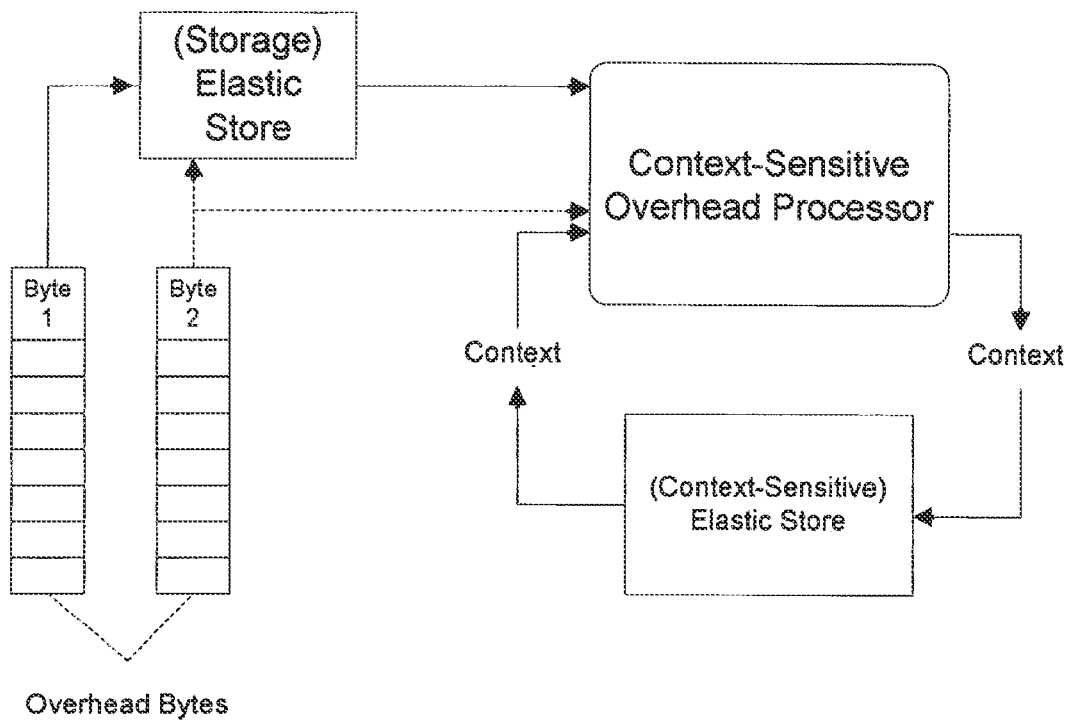
FIG. 3 depicts the present invention of the CSOP.

FIG. 2 depicts a basic synchronous state machine, as in prior art. This synchronous state machine consists of a logic element (3), which received external inputs (2) and clock signals (10), and transmits the data to a flip-flop (4), where D is signals input and Q is signals output, which sends the data back to the logic element (3). By contrast, FIG. 3 depicts the present invention of the CSOP, where if the incoming data forms one group of data, said group of data is transmitted along the datapath, optionally stored in a (Storage) elastic store, and is then transmitted into one or more flip-flop(s): if there are two or more groups of incoming data, arriving separately, the initial group(s) of received data can optionally be stored in an elastic store until the arrival of additional group(s) of data, and upon the arrival of said additional group (s) of data, all of the received data are combined and then transmitted into said flip-flop(s). The data is then transmitted from said flip-flop(s) to a logic element, which uses the received data context to determine the new data context of any imminent incoming data. The logic element transmits this new data context to a flip-flop, which transmits the new data context values into a (Context-Sensitive) elastic store. Said (Context-Sensitive) elastic store transmits the new data context back through the initial flip-flop(s) and into the logic element, prior to any additional incoming bytes arriving along the datapath, therefore reducing the need for successive overhead processors.

Figure 6:
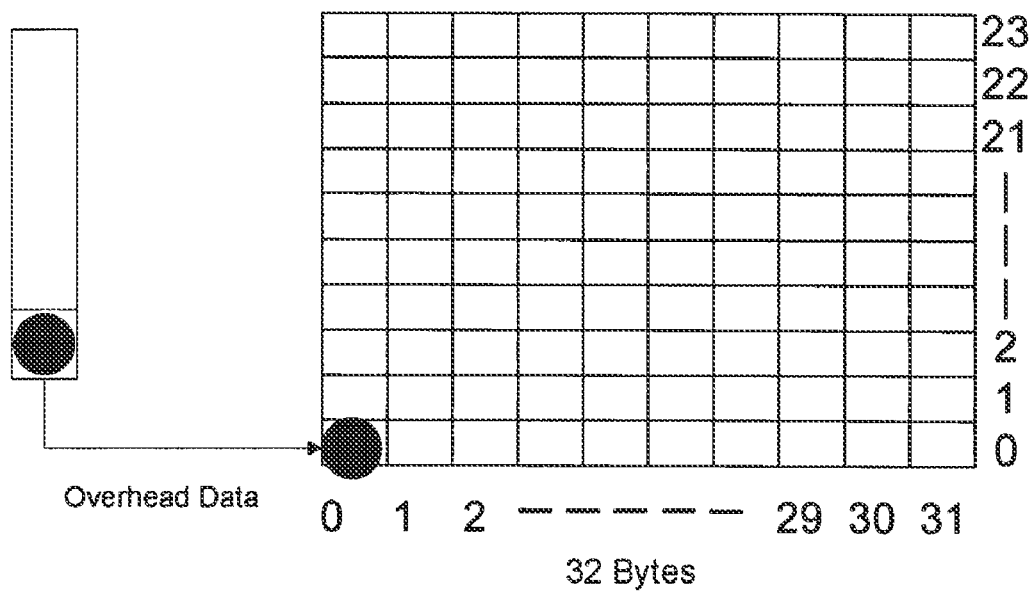
FIG. 6 depicts the present invention, employing a chip consisting of a 256 bit datapath of 32 bytes.

The present embodiment of the invention employs a chip housing a 256 bit datapath of 32 bytes; therefore, 32 bytes are received with every clock cycle; as illustrated, FIG. 6 depicts the present invention, employing a chip consisting of a 256 bit datapath of 32 bytes; 32 bytes are received with every clock cycle, and upon arrival, each of the 32 OH bytes is loaded into 24 locations (768÷32=24) of the (Storage) elastic store to wait for the next OH bytes to be transmitted and received via the 256 bit datapath. Upon arrival (in single-byte data transmission), the OH byte and context are presented to the CSOP. The CSOP uses the context, along with the OH byte, to determine the value of the next incoming OH byte context, necessary for determining relevant outputs for downstream datapath processing. In the present embodiment of the invention, each of the CSOPs is aligned with the 32 byes received on the datapath. A state machine is required to determine the current status of these received bytes. This state machine has the ability to request data from (Context-Sensitive) elastic store, a number of clock cycles before the data is required. Here, the (Context-Sensitive) elastic store acts as a delay element, which is able to fetch required data and deliver said data to an output bus. Therefore, the output OH bus needs to be exactly aligned with the incoming OH bus to receive the information properly.

Similarly, there are 32 (Context-Sensitive) elastic stores, containing the OH context, which sit stacked behind each other. The same state machine pulls data out of the (Context-Sensitive) elastic store for each individual CSOP; therefore, once the OH byte and context arrive together at the CSOP, the CSOP can write the data back on the next clock cycle.

The present embodiment of the invention is significant, where during any clock cycle the CSOP is reading data pertaining to the next location while writing data pertaining to the last location, preventing conflict within the (Context-Sensitive) elastic store (see FIG. 3). This avoids writing into (Context-Sensitive) elastic store from the same location the (Context-Sensitive) elastic store is read from, resolving any potential conflict before it occurs. The present invention can be expanded to hold multiple OH bytes, beyond one or two, in the (Storage) elastic store for later use, all to be transmitted into the CSOP at the same time.

DETAILED DESCRIPTION OF A SECOND ILLUSTRATIVE EMBODIMENT OF THE INVENTION

For explanative purposes, a second illustrative embodiment is provided in addition to the above generic embodiment. However, this second illustrative embodiment of the invention is intended for explanative purposes only, demonstrating the present invention as acting upon the pointer mechanism bytes in a SONET frame, and is not intended to limit the scope of the present invention, which is applicable to multiple OH bytes in both SONET, SDH and other methods of digital communications.

The second illustrative embodiment of the invention again employs a SONET STS-N frame, consisting of an arbitrary 768 windows, each containing 1 byte. The STS frame windows are interleaved from STS-1, STS-2, STS-3, etc., through to STS-N (which, in the present embodiment, ceases at STS-768). Therefore, employing this STS-768 frame, the receiver can expect 768H1 and H2 bytes to be transmitted.

The second illustrative embodiment of the invention employs a chip housing a 256 bit datapath of 32 bytes; therefore, 32 bytes are received with every clock cycle. Upon arrival, each of the 32 H1 bytes is loaded into 24 locations (768÷32=24) of the (H1) elastic store to wait for the H2 bytes to be transmitted and received via the 256 bit datapath. Each of the CSOPs is aligned with the 32 byes received on the datapath. A state machine is required to determine the current status of these received bytes. This state machine has the ability to request data from (Context-Sensitive) elastic store, a number of clock cycles before the data is required. Here, the (Context-Sensitive) elastic store acts as a delay element, which is able to fetch required data and deliver said data to an output bus. Therefore, the output H1 bus needs to be exactly aligned with the incoming H2 bus to receive the information properly.

Figure 4:
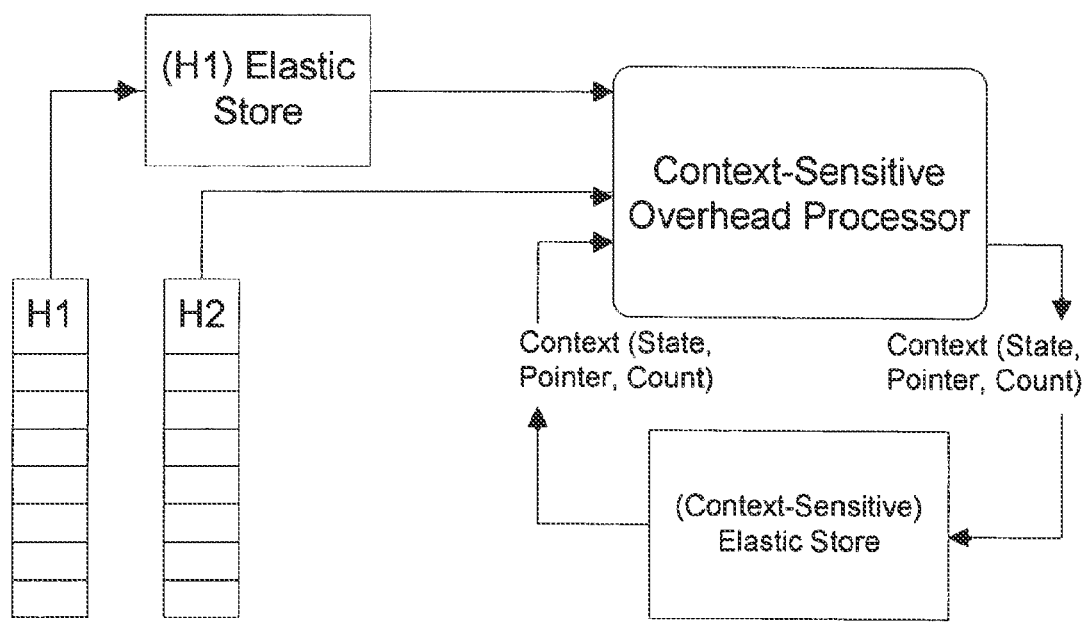
FIG. 4 depicts an illustrative embodiment of the present invention, where the CSOP acts upon the H1/H2 pointer pair.

FIG. 4 depicts the second illustrative embodiment of the present invention, where the CSOP acts upon the H1/H2 pointer pair. Here, the H1 bytes are presented to a (H1) elastic store to await the arrival of the H2 bytes on the datapath: upon the arrival of the H2 bytes, the H1/H2 pointer pair and pointer context are together presented to the CSOP. which uses the pointer state, pointer value and pointer count to determine the new pointer value, pointer state, and pointer count; the CSOP allows these new values to be written into a second elastic store, the (Context-Sensitive) elastic store: the (Context-Sensitive) elastic store then reads these values back to the original CSOP, therefore reducing the need for successive pointer processors. When acting upon SONET pointer bytes (H1/H2/H3), the object of the CSOP is to allow an elastic store to load in the context of previous pointer operations to reduce the number of pointer processors required. Therefore, the H1 byte, the first LOH byte, is transmitted and received first. In this embodiment of the present invention, this H1 byte is written into a (H1) elastic store and stored for later use. Again, when the H2 byte arrives from the datapath, the H1 byte and context are read out of (H1) elastic store; the H1/H2 pointer pair, together with the pointer context, is then presented to the CSOP. The context, including the pointer state, pointer value and pointer count, are accepted by the CSOP, and the CSOP uses these values, along with the H1/H2 pair, to determine the value of the next pointer context, necessary for determining relevant outputs for downstream datapath processing.

The context presented to the pointer processor with the H1/H2 pointer pair includes the state of the pointer (or pointer state), the pointer count and the current pointer value. The pointer state can reflect one of four events: Normal or NORM (00); Loss of Pointer or LOP (01); Concatenated or CONC (10); or Alarm in Signal or AIS (11). The pointer counter records the number of frames in which the pointer has been in the current state, if/when the pointer bytes require it to move to another state. The pointer value can range from 0 to 783 (the number of SPE bytes) and points towards the SPE (J1) in a payload envelope.

This second illustrative embodiment of the present invention is significant, for once the pointer state, pointer value and pointer count are used to determine the new pointer value, pointer state, and pointer count, the CSOP allows these new values to be written into the (Context-Sensitive) elastic store. This entire process, from the initial presentation of the H1/H2 pointer pair and pointer context to the CSOP, to the pointer processor writing the new pointer values into the (Context-Sensitive) elastic store, is completed in one clock cycle (see FIG. 4). The (Context-Sensitive) elastic store is now loaded in the correct context of the last pointer operation and reads this context back to the CSOP, therefore reducing the need for successive pointer processors. Because the CSOP is only active on this STS for one clock cycle, and because the CSOP would sit idle until the next H1/H2 pointer pair arrives, another STS can be processed by the CSOP using the exact same method.

Similarly, there are 32 (Context-Sensitive) elastic stores, containing the pointer state, pointer value and pointer count, which sit stacked behind each other. The same state machine pulls data out of the (Context-Sensitive) elastic store for each individual CSOP; therefore, once the H1 and H2 bytes, and the pointer context, arrive together at the CSOP, the CSOP can write the data back on the next clock cycle.

Figure 5:
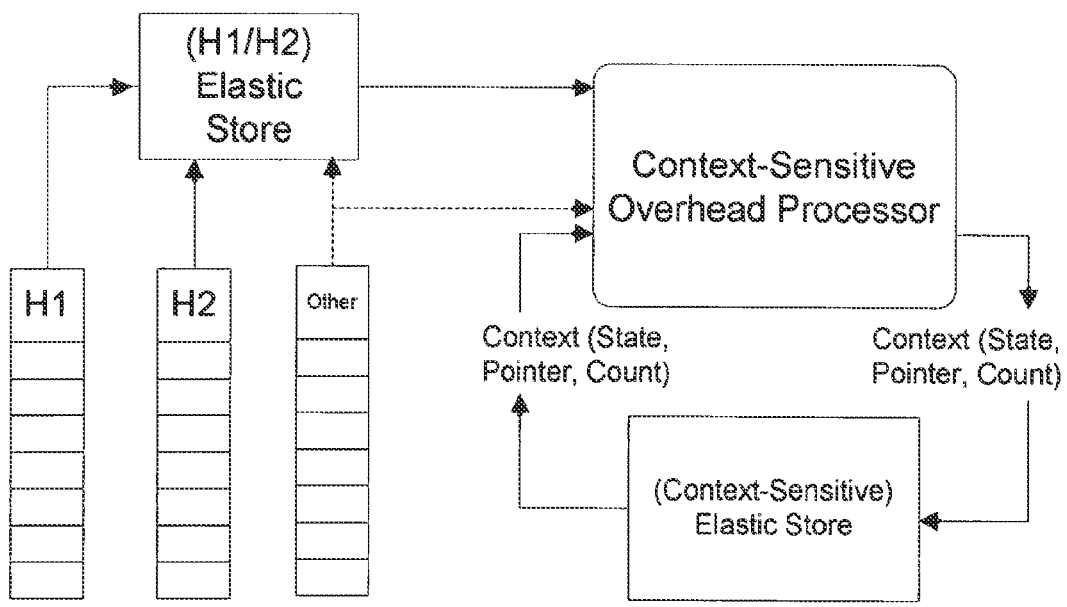
FIG. 5 depicts a further illustrative embodiment of the present invention, improving upon the illustrative embodiment of FIG. 4.

FIG. 5 depicts a further illustrative embodiment of the present invention, improving upon the illustrative embodiment of FIG. 4, where the H1 and H2 bytes are now together stored in the (H1/H2) elastic store, to await the arrival of other incoming bytes on the datapath; the H1/H2 pair and pointer context are presented with any additional overhead bytes to the CSOP, which uses the pointer state, pointer value and pointer count to determine the new pointer state, pointer value, and pointer count; the CSOP allows these new values to be written into the (Context-Sensitive) elastic store; said (Context-Sensitive) elastic store then reads these values back to the original CSOP, therefore potentially reducing the number of pointer processors down to 1. In other words, in an STS frame where N=768, 768 pointer processors are typically required; however, this method reduces the amount of pointer processors required, so the number of necessary CSOPs is equal to the number of bytes in the datapath. The present embodiment of the invention employs an arbitrary 256 bit datapath, consisting of 32 bytes. However, there is potentially enough time for both the H1 and H2 pointer bytes to be stored in the elastic store, and the same pointer processor could be used each time, to evaluate all pointer byte contexts before the arrival of other incoming bytes. While typically SONET requires one pointer processor for each and every STS in the design, the present embodiment of the invention employs the CSOP to reduce the number down to 32, one for each byte on the 256 bit datapath.

Figure 7:
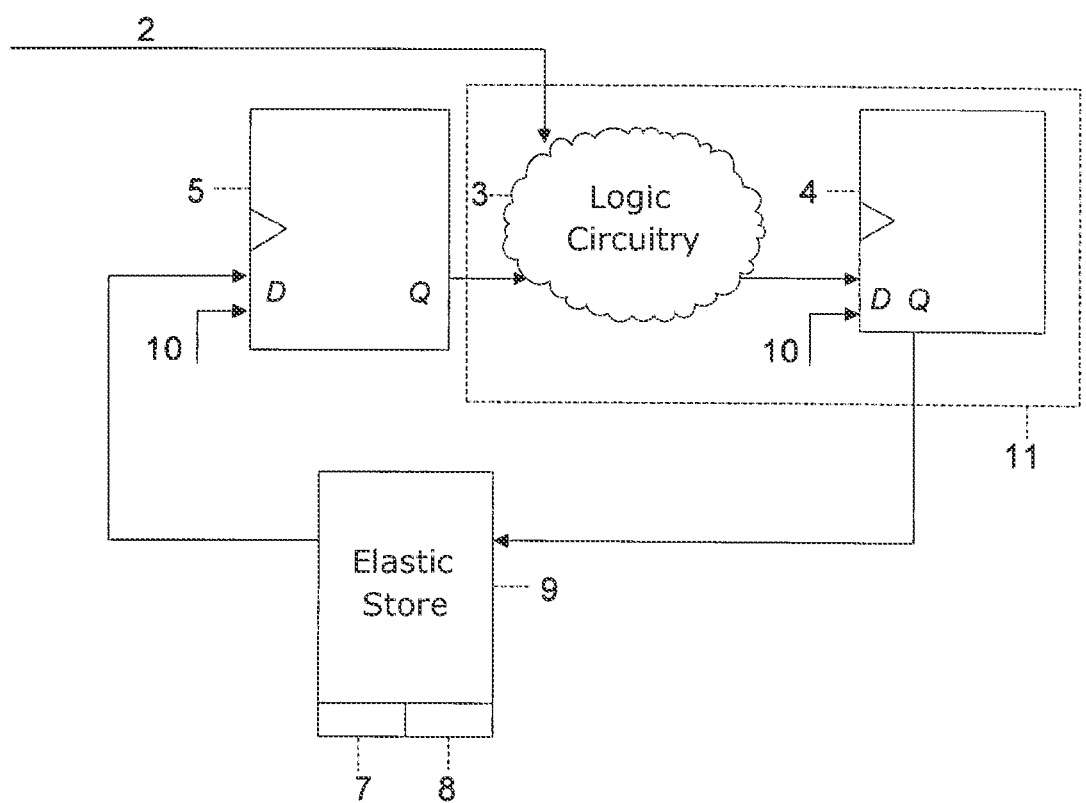
FIG. 7 illustrates a block diagram of the present invention.

FIG. 7 illustrates the present invention of the Context-Sensitive Overhead Processor (11), wherein the external inputs (2) are transmitted into a logic element (3), and then are transmitted into one or more flip-flop(s) (4), where D is signals input and Q is signals output, along with clock signals (10). From said flip-flop(s), the pointer context is written into the elastic store (9), which includes a read address (7) and a write address (8), and the elastic store (9) then writes this previous pointer context into an external flip-flop (5). Additional clock signals (10) are also read into said external flip-flop (5) and are transmitted to the logic element (3) with the previous pointer context. In order to retrieve pointer context data from said elastic store, it must be processed through the logic element, despite the amount of delay. The present invention improves upon the prior art by employing one or more flip-flop(s) (4) on the path from the logic element to the elastic store, and an additional flip-flop (5) on the path from the elastic store to the logic element. The two flip-flops reduce latency by breaking up the pathways between the elastic store and the logic element, as the latency from an elastic store, such as a RAM, is higher than the latency from a flip-flop. With the use of two flip-flops between the elastic store and the logic element, both the previous pointer context and next pointer context can be transmitted simultaneously, in one clock cycle, requiring half of the time required in the prior art.

In the generic and pointer mechanism examples described above, the present invention is able to reduce the number of overhead processors required for multi-byte data transmission. The present invention is applicable to all OH bytes; therefore this method of storing incoming data bytes could potentially reduce the number of required OH processors in synchronous optical networks to 1 (see FIG. 5).

The second embodiment of the invention is significant, where during any clock cycle the CSOP is reading data pertaining to the next location while writing data pertaining to the last location, preventing conflict within the (Context-Sensitive) elastic store. This avoids writing into (Context-Sensitive) elastic store from the same location the (Context-Sensitive) elastic store is read from, resolving any potential conflict before it occurs.

REFERENCES CITED

U.S. Patent Documents

| | |
|---|---|
| 4,873,456 | Olisar, et al. |
| 4,879,481 | Pathak, et al |
| 4,974,223 | Ancheta, et al. |
| 5,023,484 | Pathak, et al. |
| 5,471,476 | Hiramoto |
| 5,717,693 | Baydar, et al. |
| 5,809,032 | Weeber, et al. |

-continued

| | |
|---|---|
| 6,449,292 | Weeber |
| 2002/0172225 | Ang, Oon-Sim, et al. |
| 2002/0080830 | Carson, Mark, et al. |

Other References

Goralski, Walter. SONET/SDH. $3^{rd}$ ed. Toronto: McGraw-Hill, 2002.

What is claimed is:

1. A processor comprising:
storage circuitry comprising a first memory, wherein the first memory is configured to store a plurality of states associated with a plurality of state machines; and
processing circuitry configured to:
receive, on a datapath, data associated with a first state machine of the plurality of state machines, and
receive, from the storage circuitry, a state associated with the first state machine of the plurality of state machines, wherein:
the data, received by the processing circuitry on the datapath and associated with the first state machine of the plurality of state machines, is received concurrently with the state received by the processing circuitry from the storage circuitry, on a communication link different than the datapath, and associated with the first state machine of the plurality of state machines.

2. The processor of claim 1, wherein the first memory comprises an elastic store.

3. The processor of claim 1, wherein the storage circuitry further comprises a second memory configured to:
receive the state associated with the first state machine of the plurality of state machines from the first memory; and
provide the state associated with the first state machine of the plurality of state machines to the processing circuitry concurrently with the data associated with the first state machine of the plurality of state machines being received by the processing circuitry on the datapath.

4. The processor of claim 3, wherein:
the storage circuitry further comprises a third memory;
the processing circuitry is further configured to:
compute a second state associated with the first state machine of the plurality of state machines based at least in part on the received data associated with the first state machine of the plurality of state machines and the received state associated with the first state machine of the plurality of state machines, and
store the second state associated with the first state machine of the plurality of state machines in the third memory; and
the third memory is configured to transfer the second state associated with the first state machine of the plurality of state machines to the first memory.

5. The processor of claim 4, wherein:
the second memory comprises at least one flip-flop; and
the third memory comprises at least one flip-flop.

6. The processor of claim 1, wherein the processing circuitry is further configured to request that the storage circuitry provide the state associated with the first state machine of the plurality of state machines concurrently with the data associated with the first state machine of the plurality of state machines being received on the datapath.

7. The processor of claim 1, wherein the processing circuitry is further configured to compute a second state associated with the first state machine of the plurality of state machines based at least in part on the received data associated with the first state machine of the plurality of state machines and the received state associated with the first state machine of the plurality of state machines.

8. The processor of claim 1, wherein the data associated with a first state machine of the plurality of state machines and the state associated with the first state machine of the plurality of state machines are received by the processing circuitry during a single clock cycle.

9. The processor of claim 1, wherein:
the plurality of states associated with a plurality of state machines comprises a plurality of contexts;
the received state associated with the first state machine of the plurality of state machines comprises a first of the plurality of contexts; and
the data associated with the first state machine of the plurality of state machines comprises overhead bytes associated with the first of the plurality of contexts.

10. A processor comprising:
storage circuitry comprising:
a first memory, wherein the first memory is configured to store a plurality of states associated with a plurality of state machines,
a second memory,
a third memory; and
processing circuitry configured to:
receive, on a datapath, during a first clock cycle, data associated with a first state machine of the plurality of state machines,
receive, from the second memory, during the first clock cycle, a first state associated with the first state machine of the plurality of state machines,
compute a second state associated with the first state machine of the plurality of state machines based at least in part on the received data associated with the first state machine of the plurality of state machines and the received first state associated with the first state machine of the plurality of state machines, and
store the second state associated with the first state machine of the plurality of state machines in the third memory.

11. The processor of claim 10, wherein:
the plurality of states associated with a plurality of state machines comprise a plurality of contexts;
the received first state associated with the first state machine of the plurality of state machines comprises a first of the plurality of contexts;
the data associated with the first state machine of the plurality of state machines comprises overhead bytes associated with the first of the plurality of contexts; and
the computed second state associated with the first state machine of the plurality of state machines comprises a second of the plurality of contexts.

12. A method comprising:
storing a plurality of states associated with a plurality of state machines using storage circuitry, wherein the storage circuitry comprises a first memory;
receiving, on a datapath, data associated with a first state machine of the plurality of state machines; and
receiving, from the storage circuitry, a state associated with the first state machine of the plurality of state machines, wherein:
the data, received on the datapath and associated with the first state machine of the plurality of state machines, is received concurrently with the state received from the storage circuitry, on a communication link different than the datapath, and associated with the first state machine of the plurality of state machines.

13. The method of claim 12, wherein the first memory comprises an elastic store.

14. The method of claim 12, wherein the storage circuitry further comprises a second memory, the method further comprising:
transferring the state associated with the first state machine of the plurality of state machines from the first memory to the second memory; and
receiving the state associated with the first state machine of the plurality of state machines from the second memory at the same time as receiving the data associated with the first state machine of the plurality of state machines.

15. The method of claim 14, wherein the storage circuitry further comprises a third memory, the method further comprising:
computing a second state associated with the first state machine of the plurality of state machines based at least in part on the received data associated with the first state machine of the plurality of state machines and the received state associated with the first state machine of the plurality of state machines; and
storing the second state associated with the first state machine of the plurality of state machines in the third memory, wherein the third memory is configured to transfer the second state associated with the first state machine of the plurality of state machines to the first memory.

16. The method of claim 15, wherein:
the second memory comprises at least one flip-flop; and
the third memory comprises at least one flip-flop.

17. The method of claim 12, further comprising requesting that the storage circuitry provide the state associated with the first state machine of the plurality of state machines at the same time as the data associated with the first state machine of the plurality of state machines is received on the datapath.

18. The method of claim 12, the further comprising computing a second state associated with the first state machine of the plurality of state machines based at least in part on the received data associated with the first state machine of the plurality of state machines and the received state associated with the first state machine of the plurality of state machines.

19. The method of claim 12, wherein the data associated with a first state machine of the plurality of state machines and the state associated with the first state machine of the plurality of state machines are received during a single clock cycle.

20. The method of claim 12, wherein:
the plurality of states associated with a plurality of state machines comprise a plurality of contexts;
the received state associated with the first state machine of the plurality of state machines comprises a first of the plurality of contexts; and
the data associated with the first state machine of the plurality of state machines comprises overhead bytes associated with the first of the plurality of contexts.

* * * * *